No. 12,232. REISSUED JUNE 21, 1904.
C. E. SCRIBNER.
CONNECTION COUNTER FOR TELEPHONE EXCHANGES.
APPLICATION FILED MAY 25, 1904.
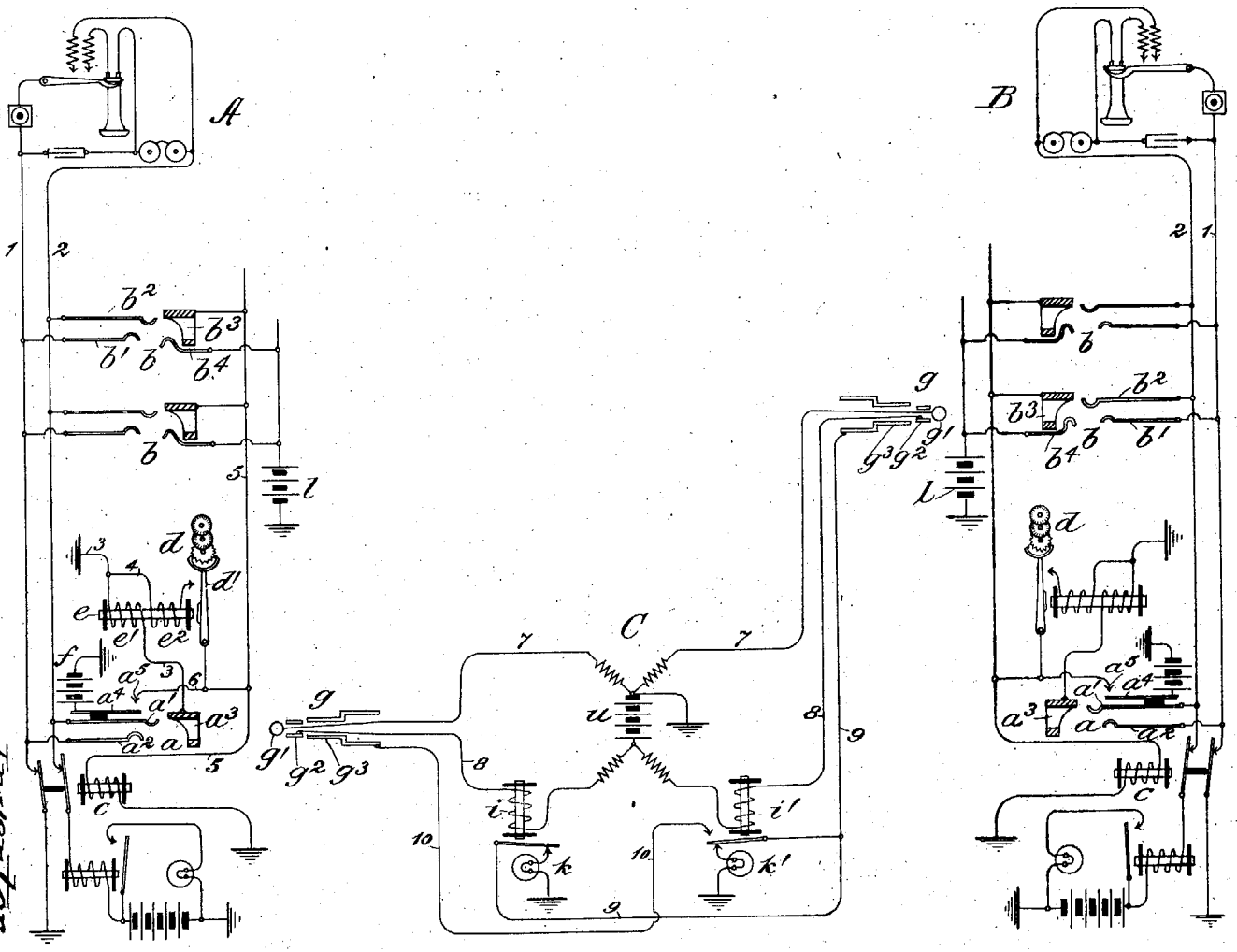
Witnesses.
Irving Mac Donald.
Geo. C. Orion.
Inventor.
Charles E. Scribner.
By George R. Barton
Atty.
THE NORRIS PETERS CO., WASHINGTON, D.C.

No. 12,232. Reissued June 21, 1904.

UNITED STATES PATENT OFFICE.

CHARLES E. SCRIBNER, OF JERICHO, VERMONT, ASSIGNOR TO THE WESTERN ELECTRIC COMPANY, OF CHICAGO, ILLINOIS, A CORPORATION OF ILLINOIS.

CONNECTION-COUNTER FOR TELEPHONE-EXCHANGES.

SPECIFICATION forming part of Reissued Letters Patent No. 12,232, dated June 21, 1904.

Original No. 680,890, dated August 20, 1901. Application for reissue filed May 25, 1904. Serial No. 209,806.

*To all whom it may concern:*

Be it known that I, CHARLES E. SCRIBNER, a citizen of the United States, residing at Jericho, in the county of Chittenden and State of Vermont, have invented a certain new and useful Improvement in Connection-Counters for Telephone-Exchanges, (Case No. 479,) of which the following is a full, clear, concise, and exact description.

My invention relates to the measurement of telephone-service, and has for its object to provide a connection-counter and circuits therefor associated with each telephone-line, whereby each call for a connection sent in from the substation of a line in response to which a connection has been completed to some other line may automatically be registered.

In accordance with my invention an electromagnetic counting or registering device is associated with each line, said device having two windings or helices. One of these windings is included in a circuit which is brought under the control of a relay, such as the supervisory relay, which is controlled by the flow of current in the called line, whereby the counting mechanism is caused to register the connection when the called subscriber responds. The other winding of the counting device is included in a local circuit which is closed when the counter is operated, so that when the called subscriber responds the counter will operate but once and will thereafter be locked or rendered inert to subsequent changes in the electrical condition of the called line. Both of these circuits, which include the windings of the counting device, are preferably further controlled by switch-contacts closed by the insertion of the answering-plug in the answering spring-jack of the calling-line, and the circuit which is first completed by the response of the called subscriber preferably derives current from a battery applied through the medium of a switch-contact on the line-jack of the called line into which the connecting-plug has been inserted.

Further features of my invention will hereinafter be set forth, and particularly pointed out in the appended claims.

The accompanying drawing is a diagram illustrating by the aid of conventional symbols two telephone-lines extending from substations to a central office and a pair of plugs and their plug-circuit for connecting the two lines together; the system being equipped with the connection-registers and circuits therefor in accordance with my invention.

Two substations A B are illustrated equipped with the usual switching, signaling, and telephone apparatus, the metallic circuit-lines of each substation extending to the multiple switchboard at the central office C. The apparatus and circuits for both lines are identical. An answering spring-jack $a$ and line spring-jacks $b$ $b$ are provided for each line at the central office, and the limbs 1 2 of the telephone-lines are multiplied to the several spring-jacks, terminating in the back contacts of the usual cut-off relay $c$. The line signaling apparatus is of the usual type and need not be particularly described.

The answering spring-jack $a$ is provided with the usual long and short line springs $a^1$ $a^2$, connected, respectively, with the limbs 2 1 of the telephone-line for engaging the ring and tip contacts, respectively, of a switch-plug, and a third contact or test-ring $a^3$ is provided for engaging the sleeve or shank contact-piece of the switch-plug. The answering-jack is further provided with a contact-spring $a^4$, which is adapted to be forced into engagement with the contact-anvil $a^5$ when a plug is inserted in the spring-jack, the spring $a^4$ and anvil $a^5$ being normally separated.

The line spring-jacks are similar to the answering-jack in many respects, having line-springs $b^1$ $b^2$, connected, respectively, with the limbs 1 2 of the telephone-line and having a third contact or test-ring $b^3$. They differ from the answering-jack, however, in that no spring and anvil, such as $a^4$ $a^5$ of the answering-jack, are provided and that a third spring $b^4$ is associated with the test-ring $b^3$, normally separated therefrom, but adapted to be engaged, together with the test-ring, by the third contact or shank of the plug when the latter is inserted in the jack. The springs $b^4$ $b^4$ of the line-jacks are connected together and to ground through the battery $l$.

A counting device of the well-known type is associated with each subscriber's line at the central office, consisting of a measuring-train $d$, with a lever $d'$ for operating the same, said lever constituting the armature of an electromagnet $e$. Two windings $e'$ $e^2$ are provided for the magnet $e$. The winding $e'$ is included in the conductor 3, which extends from the test-ring $a^3$ of the answering-jack to ground, and the other winding, $e^2$, is included in a conductor 4, which extends from ground to a relay-contact with which the armature $d'$ of the magnet is adapted to engage when in its attracted position. The armature $d'$ is connected by a conductor 5 with the test-contacts $b^3$ $b^3$ of the line-jacks and through the helix of the cut-off relay $c$ to ground. A branch wire 6 connects armature $d'$ with the contact-anvil $a^5$ of the answering-jack, and the spring $a^4$ of the answering-jack is grounded through the source of current $f$.

An ordinary pair of plugs $g$ $g$ is illustrated, whose tip-contacts $g'$ and sleeve-contacts $g^2$ are united by cord-strands 7 8, respectively, through the windings of a repeating-coil in the usual manner, the side of the battery which is connected with the cord-strand 7 being grounded. Two supervisory relays $i$ $i'$ are associated with the cord-circuit, the winding of each relay being included between its plug and the repeating-coil. The armatures of these relays are connected together, and the normal resting contacts of said armatures are grounded through the supervisory signal-lamps $k$ $k'$. A conductor 9 unites the armatures of the supervisory relays with the shank or third contact $g^3$ of the calling-plug, and a conductor 10 unites the shank or third contact $g^3$ of the answering-plug with the front contact of relay $i'$, so that when the said relay is energized conductors 9 and 10 will be connected together to unite the shanks $g^3$ $g^3$ of the pair of plugs.

To recapitulate, there is one circuit from ground through the electromagnet of the counting mechanism, which is extended to the conductor 10 of the cord-circuit when the answering-plug is inserted in the answering spring-jack and which is completed by the supervisory relay $i'$ when the called subscriber responds, receiving current from battery $l$ by way of the test-contacts of the line spring-jacks of the called line. Then after the armature $d'$ of the counting device has once been drawn up a second or retaining circuit will be closed through the winding $e^2$ of the magnet by way of the front contact, against which the armature $d'$ is drawn, and by way of the extra contact $a^4$ and anvil $a^5$ of the answering-jack, current being derived from the battery $f$.

To outline briefly the operation of this system, let it be supposed that the subscriber at substation A desires his line to be connected with the line of subscriber B. He removes his telephone-receiver from its hook, and a signal is transmitted to the central office in the usual manner, to which the operator responds by inserting the answering-plug of a pair into the answering spring-jack $a$ of the calling-line. The extra contact-spring $a^4$ of the answering-jack is thus forced into engagement with its contact-anvil $a^5$, extending the circuit of battery $f$ to the armature $d'$ of the counting-magnet and completing the circuit of said battery through the winding of the cut-off relay $c$ by way of conductor 5. The cut-off relay is thus energized and operates in the usual manner to disconnect the line-signaling apparatus from circuit. At the same time the engagement between the test-ring $a^3$ of the answering-jack and the shank $g^3$ of the answering-plug extends the circuit from ground through the winding $e'$ of the counting-magnet by way of conductor 3 to the conductor 10 of the cord-circuit, which terminates at the front contact of relay $i'$. The operator having learned the number of the called subscriber inserts the calling-plug of the pair into the line-jack of the called subscriber's line. The battery $l$ of the called line is thus connected with the armatures of the supervisory relays by way of conductor 9, the shank $g^3$ of the calling-plug, and the test-ring $b^3$ and spring $b^4$ of the line-jack. Current from battery $l$ of the called line will flow to ground through the winding of the cut-off relay $c$ of the called line and will thereby effect the disconnection of the line-signal apparatus of the called line from circuit. Until the subscriber at the calling-station removes his telephone from its hook and closes the low-resistance bridge across the limbs of his line through his telephone apparatus enough current to operate the supervisory relay $i'$ of the called line will not flow through the winding thereof and the relay will remain inert, closing the circuit of battery $l$ to ground through supervisory signal-lamp $k'$. This lamp therefore serves as a guard-signal and remains lighted until the called subscriber responds. When he does, current from the centralized battery $u$ of the cord-circuit flows through the winding of the supervisory relay $i'$ and causes the armature thereof to be attracted, thus effecting the completion of the circuit 9 10 between the shanks $g^3$ $g^3$ of the pair of plugs. The ground branch circuit through the lamp $k'$ is simultaneously broken, so that the lamp is darkened. Current from battery $l$ is now permitted to flow to ground through the winding $e'$ of the counting-magnet over the following path: from the ground-battery $l$ to the spring $b^4$ of the line-jack of the called line, shank $g^3$ of the connecting-plug, conductors 9 10, shank $g^3$ of the answering-plug, test-ring $a^3$ of the answering-jack of the calling-line, conductor 3, and to ground through the winding $e'$ of the counting-magnet. The counting-magnet is thus energized and attracts its armature-lever $d'$, whereby the connection is registered by the counting-train $d$. Circuit from battery $f$ of the calling-line through the winding $c^2$ of the counting-magnet is simultaneously closed to ground by way of the relay-contact, against which the armature $d'$ is attracted. This last-mentioned circuit is now controlled by the spring $a^4$ and the anvil $a^5$ of the answering-jack. It therefore remains closed during the entire connection until the answering-plug is removed from the jack irrespective of any subsequent changes in the other circuit. The response of the called subscriber in operating his switch-hook thus effects the operation of the counting mechanism, but at the same time closes the local circuit, which renders the counting mechanism independent of any subsequent changes in the circuit of the called line. The called subscriber therefore cannot increase the number of registrations by vibrating his switch-hook. When the subscribers have finished their conversation, as each replaces his telephone upon its hook and breaks the circuit of the battery $n$ through his telephone-line the supervisory relay which has been associated with his line will be de-energized and will allow its armature to fall back. The local circuit through the supervisory lamp will thus be closed and will receive current from the battery $l$ of the called line, thus lighting the lamp, which indicates to the operator that the conversation has been finished and that the connection may be taken down. In removing the answering-plug from the answering-jack of the called line the circuit of battery $f$ through the counting-magnet will be broken at the contacts $a^4$ $a^5$ and the magnet will be deenergized, allowing its armature $d'$ to fall back to its normal or unattracted position.

Having thus described my invention, I claim as new, and desire to secure by Letters Patent, the following:

1. The combination with two telephone-lines united for communication through a plug-circuit, of a service-meter associated with one of the lines, a supervisory relay responsive to current in the other line determined by a telephone-switch at the station of said line, a local battery-circuit connected with a local contact-piece of the spring-jack of the called line, closed through a registering contact-piece of the plug in said spring-jack, and having two branches adapted to be closed alternately by the supervisory relay, a supervisory signal-lamp being contained in one of said branches, and the other of said branches being continued through a winding of the service-meter of the other line by means of registering-contacts of the answering-jack and answering-plug, as described.

2. The combination with two telephone-lines extending from substations to a central office, of spring-jacks for the lines at the central office, a pair of plugs and their plug-circuit for uniting the lines in response to a call from one of the lines, an electromagnetic connection-register associated with the calling-line, a supervisory relay in one of the conductors of the plug-circuit, controlled by the flow of current in the called line, a source of current connected with a contact of the spring-jack of the called line, a conductor 9 forming a part of the plug-circuit and adapted to be connected with said source of current when the connecting-plug is inserted in the spring jack of the called line, an armature for the said supervisory relay connected with said conductor 9, a back contact for the said armature connected through a signal $k'$ with a return-conductor leading to the said source of current, a front contact for the said armature, and a return-circuit from said front contact to the source of current, including the magnet of said connection-register, substantially as set forth.

3. The combination with two telephone-lines extending from substations to a central office, of spring-jacks for the lines at the central office, an answering spring-jack and a line spring-jack for each line, a pair of plugs and their plug-circuit for connecting the lines together from the answering-jack of the calling-line to a line-jack of the called line, a connection-register included in a grounded branch from a contact $a^3$ of the answering-jack of the calling-line, a supervisory relay included in a conductor of a cord-circuit and controlled by the flow of current in the called line, an armature for said relay, a grounded source of current connected with a contact of the line spring-jack of the called line and adapted to be connected with the armature of said relay when the connecting-plug is inserted in said line-jack, a supervisory signal $k'$ included in a grounded conductor from the back contact of said supervisory relay, and a conductor 10 connecting the front contact of said supervisory relay with a contact of the answering-plug and so with said contact $a^3$, substantially as and for the purpose set forth.

In witness whereof I have hereunto subscribed my name this 30th day of April, A. D. 1904.

CHARLES E. SCRIBNER.

Witnesses:

D. E. WILLETT,

ELLA EDLER.